US012650680B2

(12) United States Patent
Yamazaki et al.

(10) Patent No.: US 12,650,680 B2
(45) Date of Patent: Jun. 9, 2026

(54) TRAJECTORY GENERATION SYSTEM, TRAJECTORY GENERATION METHOD, AND NON-TRANSITORY STORAGE MEDIUM

(71) Applicants: TOYOTA JIDOSHA KABUSHIKI KAISHA, Toyota (JP); SHINSHU UNIVERSITY, Nagano (JP)

(72) Inventors: Kimitoshi Yamazaki, Nagano (JP); Takuya Iwasaki, Nagano (JP); Keisuke Takeshita, Toyota (JP)

(73) Assignees: TOYOTA JIDOSHA KABUSHIKI KAISHA, Toyota (JP); SHINSHU UNIVERSITY, Matsumoto (JP)

( * ) Notice: Subject to any disclaimer, the term of this patent is extended or adjusted under 35 U.S.C. 154(b) by 121 days.

(21) Appl. No.: 18/598,031

(22) Filed: Mar. 7, 2024

(65) Prior Publication Data

US 2024/0329623 A1 Oct. 3, 2024

(30) Foreign Application Priority Data

Mar. 30, 2023 (JP) ................................ 2023-055327

(51) Int. Cl.
*B25J 9/16* (2006.01)
*G05B 19/4155* (2006.01)

(52) U.S. Cl.
CPC ........ *G05B 19/4155* (2013.01); *B25J 9/1664* (2013.01); *G05B 2219/40269* (2013.01)

(58) Field of Classification Search
CPC ....... G05B 19/4155; G05B 2219/40269; B25J 9/1664; B25J 9/1666; B25J 9/1676
See application file for complete search history.

(56) References Cited

U.S. PATENT DOCUMENTS

| | | | | |
|---|---|---|---|---|
| 2012/0209428 A1* | 8/2012 | Mizutani | ............. | G05B 19/423 |
| | | | | 700/250 |
| 2017/0210008 A1* | 7/2017 | Maeda | ................... | B25J 9/1682 |
| 2019/0240835 A1* | 8/2019 | Sorin | ................... | G05D 1/0214 |
| 2020/0306980 A1* | 10/2020 | Choi | ..................... | B25J 9/1697 |
| 2021/0187746 A1* | 6/2021 | Beardsworth | .......... | B25J 9/1694 |
| 2021/0220994 A1* | 7/2021 | Colasanto | ............. | B25J 9/1666 |
| 2021/0252707 A1* | 8/2021 | Wang | .................... | B25J 9/1671 |

(Continued)

FOREIGN PATENT DOCUMENTS

JP          2021-024019 A          2/2021

*Primary Examiner* — Stephen Holwerda
(74) *Attorney, Agent, or Firm* — Oliff PLC

(57) ABSTRACT

A system includes: one or more memories; and one or more processors configured to, acquire three-dimensional data of an environment at a first timing; extract a plurality of pieces of motion data from the one or more memories, the motion data including the target end-effector position and attitude and a swept volume that does not contact the environment; start the task based on first motion data, the first motion data being one of the extracted pieces of motion data; when determination is made that the mobile manipulator comes into contact with the environment, extract, as second motion data, motion data including a swept volume that does not contact the environment based on the three-dimensional data acquired in real time; and generate a transition trajectory for transitioning from a trajectory of the first motion data to a trajectory of the second motion data.

13 Claims, 9 Drawing Sheets

| INITIAL SV | AVOIDANCE SV | TRANSITION SV |
|---|---|---|

INITIAL SV $q_{start}$

AVOIDANCE SV $q_{end}$

OBSTACLE $q_{end}$

TRANSITION SV $q_{start}$

OBSTACLE

(56) References Cited

U.S. PATENT DOCUMENTS

| | | | |
|---|---|---|---|
| 2021/0316455 A1* | 10/2021 | Bingham | G06N 3/0455 |
| 2021/0379762 A1* | 12/2021 | Denenberg | B25J 9/1651 |
| 2022/0168899 A1* | 6/2022 | Boroushaki | G06K 19/0723 |

* cited by examiner

MANAGEMENT SERVER ~80

| CPU ~80a | MEMORY ~80b | COMMUNICATION IF ~80c |

DATABASE GENERATION UNIT — 81

BASIC DATABASE — 82

DATA RECEPTION UNIT — 83

CANDIDATE MOTION DATA EXTRACTION UNIT — 85

CANDIDATE DATABASE — 86

82

| No. | y | Q | SV |
|-----|-----|-----|-----|
| 1 | $y_1$ | $Q_1=[q_1,q_2, \cdots ]$ | $SV_1$ |
| 2 | $y_2$ | $Q_2$ | $SV_2$ |
| 3 | $y_3$ | $Q_3$ | $SV_3$ |
| . | . | . | . |
| . | . | . | . |
| . | . | . | . |
| . | . | . | . |
| N−1 | $y_{N-1}$ | $Q_{N-1}$ | $SV_{N-1}$ |
| N | $y_N$ | $Q_N$ | $SV_N$ |

| No. | $y$ | $Q$ | SV |
|---|---|---|---|
| 17 | $y_{17}$ | $Q_{17}$ | $SV_{17}$ |
| 712 | $y_{712}$ | $Q_{712}$ | $SV_{712}$ |
| 801 | $y_{801}$ | $Q_{801}$ | $SV_{801}$ |
| × | × | × | × |
| × | × | × | × |
| ∘ | ∘ | ∘ | ∘ |
| ∘ | ∘ | ∘ | ∘ |
| 8191 | $y_{8191}$ | $Q_{8191}$ | $SV_{8191}$ |
| 9722 | $y_{9722}$ | $Q_{9722}$ | $SV_{9722}$ | d=1      d=2      d=3

OBSTACLE

TRAJECTORY GENERATION SYSTEM, TRAJECTORY GENERATION METHOD, AND NON-TRANSITORY STORAGE MEDIUM

CROSS-REFERENCE TO RELATED APPLICATION

This application claims priority to Japanese Patent Application No. 2023-055327 filed on Mar. 30, 2023, incorporated herein by reference in its entirety.

BACKGROUND

1. Technical Field

The present disclosure relates to trajectory generation systems, trajectory generation methods, and non-transitory storage media.

2. Description of Related Art

Japanese Unexamined Patent Application Publication No. 2021-024019 (JP 2021-024019 A) discloses a trajectory generation device for a mobile manipulator. Specifically, the trajectory generation device uses a database storing a plurality of pieces of motion data.

Each piece of motion data is composed of a combination of a target end-effector position and attitude, a trajectory of the mobile manipulator for moving an end-effector position and attitude of the mobile manipulator to the target end-effector position and attitude, and a swept volume (SV) that is the volume occupied by the mobile manipulator as the mobile manipulator moves along the trajectory.

When the mobile manipulator starts a task, it acquires three-dimensional point cloud data of a service environment, performs a search in the database using a target end-effector position and attitude corresponding to the task as a key, and extracts motion data including a target end-effector position and attitude close to the target end-effector position and attitude corresponding to the task and including a swept volume that does not interfere with the service environment.

The mobile manipulator then moves along the trajectory of the extracted motion data.

SUMMARY

In the configuration of Japanese Unexamined Patent Application Publication No. 2021-024019 (JP 2021-024019 A), however, it is assumed that there are no unknown obstacles that may come into contact with the mobile manipulator while the mobile manipulator is moving after it started the task.

Therefore, when it is determined that the mobile manipulator comes into contact with a constantly changing service environment while the mobile manipulator is moving after it started the task, an extraction process for extracting appropriate motion data from the database will have to be performed again. That is, the mobile manipulator is forced to wait for a long time until the extraction process is completed.

The present disclosure provides a technique of, when it is determined that a mobile manipulator comes into contact with a service environment, generating in a short time a trajectory of the mobile manipulator that allows the mobile manipulator to complete a task while avoiding contact with the service environment.

A trajectory generation system according to a first aspect of the present disclosure includes: one or more memories, the one or more memories being configured to store a plurality of pieces of motion data, the motion data including a target end-effector position and attitude, a trajectory of a mobile manipulator for moving an end-effector position and attitude of the mobile manipulator to the target end-effector position and attitude, and a swept volume, the swept volume being a three-dimensional shape defined by the mobile manipulator as the mobile manipulator moves along the trajectory; and one or more processors, the one or more processors being configured to, acquire three-dimensional data of an environment at a first timing; extract, from the one or more memories, a plurality of pieces of motion data, the motion data including the target end-effector position and attitude corresponding to a task, and including a swept volume that does not contact the environment based on the three-dimensional data acquired at the first timing; start the task based on first motion data, the first motion data being one of the extracted pieces of motion data; acquire the three-dimensional data of the environment in real time after the first timing, and determine whether the mobile manipulator comes into contact with the environment based on the three-dimensional data acquired in real time before the mobile manipulator completes the task; when determination is made that the mobile manipulator comes into contact with the environment, extract, as second motion data, motion data including a swept volume that does not contact the environment based on the three-dimensional data acquired in real time from the extracted pieces of motion data; and generate a transition trajectory for transitioning from a trajectory of the first motion data to a trajectory of the second motion data.

According to the above configuration, when determination is made that the mobile manipulator comes into contact with a service environment while the mobile manipulator is moving after it started the task, the trajectory of the mobile manipulator that allows the mobile manipulator to complete the task while avoiding contact with the service environment can be generated in a short time.

In the trajectory generation system according to the above aspect, a difference between a trajectory starting point of the transition trajectory and a trajectory end point of the transition trajectory may be less than a predetermined value. According to the above configuration, the transition trajectory generation process is stabilized.

In the trajectory generation system according to the above aspect, an angle between a first direction and a second direction is less than a predetermined value, the first direction being a direction of a trajectory end point of the transition trajectory as seen from a trajectory starting point of the transition trajectory and the second being a direction immediately after completion of transition to the trajectory of the second motion data. According to the above configuration, smooth movement of the mobile manipulator can be implemented when shifting from the transition trajectory to the trajectory of the second motion data.

In the trajectory generation system according to the above aspect, a trajectory end point of the transition trajectory is a most downstream trajectory point among a plurality of trajectory points that simultaneously satisfies a first condition that a difference between a trajectory starting point of the transition trajectory and the trajectory end point of the transition trajectory is less than a predetermined value, and a second condition that an angle between a first direction of the trajectory end point and a second direction immediately after completion of transition to the trajectory of the second motion data as seen from the trajectory starting point is less than a predetermined value, the first direction being a direction of the trajectory end point as seen from the trajectory starting point and the second being a direction immediately after completion of transition to the trajectory of the second motion data. According to the above configuration, the transition trajectory generation process is stabilized, smooth movement of the mobile manipulator can be implemented when shifting from the transition trajectory to the trajectory of the second motion data, and the time required for the mobile manipulator to perform the task can be reduced.

In the trajectory generation system according to the above aspect, the one or more processors may be configured to generate the transition trajectory by quadratic programming based on a first cost function for reducing a difference between two consecutive trajectory points of the mobile manipulator and a second cost function for avoiding the environment based on the three-dimensional data acquired in real time. According to the above configuration, the transition trajectory can be generated in a rational manner.

In the trajectory generation system according the above aspect, the one or more processors may be configured to calculate the first cost function by weighting the difference between the two consecutive trajectory points of the mobile manipulator based on an avoidance amount and obtaining a sum of differences after weighting, the avoidance amount being an amount for allowing the mobile manipulator to avoid the environment based on the three-dimensional data acquired in real time. According to the above configuration, when generating the transition trajectory so as to avoid contact between the mobile manipulator and the service environment based on the three-dimensional point cloud data acquired in real time, the two consecutive trajectory points are less likely to separate too far away from each other.

In the trajectory generation system according the above aspect, the one or more processors may be configured to calculate an avoidance amount based on a logarithm of an amount of overlap between the mobile manipulator and the environment based on the three-dimensional data acquired in real time, the avoidance amount being an amount for allowing the mobile manipulator to avoid the environment based on the three-dimensional data acquired in real time. According to the above configuration, the transition trajectory generation process using quadratic programming is stabilized.

A trajectory generation method according to a second aspect of the present disclosure is a trajectory generation method in which a computer generates a trajectory by referring to one or more memories configured to store a plurality of pieces of motion data, the motion data including a target end-effector position and attitude, a trajectory of a mobile manipulator for moving an end-effector position and attitude of the mobile manipulator to the target end-effector position and attitude, and a swept volume, the swept volume being a three-dimensional shape defined by the mobile manipulator as the mobile manipulator moves along the trajectory, the trajectory generation method comprising: acquiring three-dimensional data of an environment at a first timing; extracting, from the one or more memories, a plurality of pieces of motion data, the motion data including the target end-effector position and attitude corresponding to a task and including a swept volume that does not contact the environment based on the three-dimensional data acquired at the first timing; starting the task based on first motion data, the first motion data being one of the extracted pieces of motion data; acquiring the three-dimensional data of the environment in real time after the first timing and determining whether the mobile manipulator comes into contact with the environment based on the three-dimensional data acquired in real time before the mobile manipulator completes the task; when determination is made that the mobile manipulator comes into contact with the environment, extracting, as second motion data, motion data including a swept volume that does not contact the environment based on the three-dimensional data acquired in real time from the extracted pieces of motion data; and generating a transition trajectory for transitioning from a trajectory of the first motion data to a trajectory of the second motion data.

According to the above method, when determination is made that the mobile manipulator comes into contact with a service environment while the mobile manipulator is moving after it started the task, the trajectory of the mobile manipulator that allows the mobile manipulator to complete the task while avoiding contact with the service environment can be generated in a short time.

A non-transitory storage medium according to a third aspect of the present disclosure is a non-transitory storage medium storing instructions that are executable by one or more processors and that cause the one or more processors to perform the trajectory generation method according to the above aspect.

According to the present disclosure, when determination is made that the mobile manipulator comes into contact with a service environment while the mobile manipulator is moving after it started the task, the trajectory of the mobile manipulator that allows the mobile manipulator to complete the task while avoiding contact with the service environment can be generated in a short time.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 5 is a data structure diagram of a candidate database;

DETAILED DESCRIPTION OF EMBODIMENTS

Hereinafter, a specific embodiment to which the present disclosure is applied will be described in detail with reference to the drawings. However, the present disclosure is not limited to the following embodiment. The following description and the drawings are simplified as appropriate for clarity.

Figure 1:
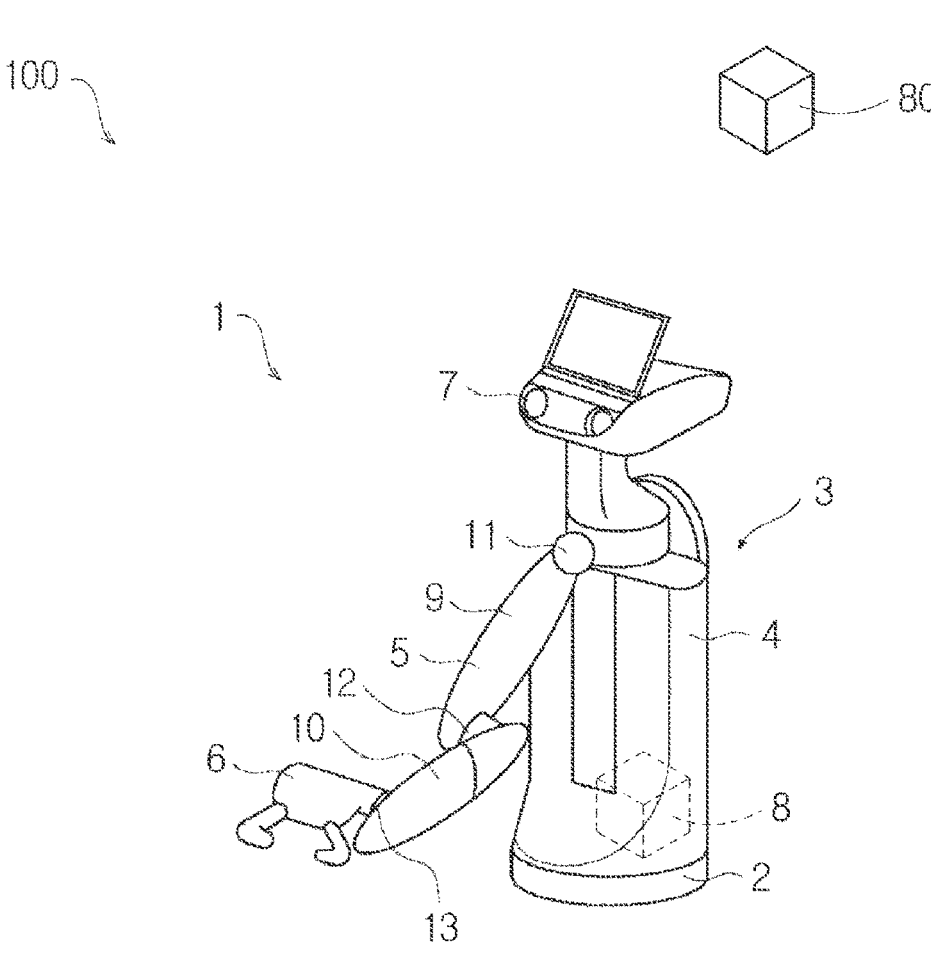
FIG. 1 is a perspective view of a mobile manipulator.

First, a mobile manipulator 1 will be described with reference to FIG. 1. The mobile manipulator 1 is a so-called Human Support Robot (HSR). The mobile manipulator 1 is configured to autonomously perform tasks such as cleaning up dishes, taking an item from a storage shelf, and putting an item on a storage shelf.

The mobile manipulator 1 includes a mobile platform 2 and a robot 3 mounted on the mobile platform 2 in order to perform the tasks mentioned above.

The mobile platform 2 typically includes a plurality of wheels and a drive motor. Movement of the mobile manipulator 1 in a service environment is implemented by rotating at least one of the wheels by the drive motor.

The service environment is a specific example of the "environment." The environment can also be referred to as an external environment as seen from the mobile manipulator 1.

The robot 3 includes a robot body 4, an articulated manipulator 5 supported by the robot body 4, an end effector 6 provided at the distal end of the manipulator 5, an environment sensor 7, and a control unit 8.

The manipulator 5 includes an upper arm link 9 and a forearm link 10. The upper arm link 9 is connected to the robot body 4 via a shoulder joint 11. The upper arm link 9 and the forearm link 10 are connected via an elbow joint 12. The end effector 6 is connected to the distal end of the forearm link 10 via a wrist joint 13.

The environment sensor 7 outputs three-dimensional point cloud data of the service environment to the control unit 8 by scanning the service environment of the mobile manipulator 1. The environment sensor 7 is typically a red green blue-depth (RGB-D) camera, a stereo camera, a laser range finder, or an ultrasonic sensor. The three-dimensional point cloud data is a specific example of the "three-dimensional data." The environment sensor 7 may be installed in the service environment instead of being mounted on the mobile manipulator 1. In addition to the mobile manipulator 1 including the environment sensor 7, another environment sensor may be installed in the service environment.

In the present embodiment, a trajectory generation system 100 includes the mobile manipulator 1 and a management server 80. The trajectory generation system 100 is implemented by distributed processing by the mobile manipulator 1 and the management server 80. However, the management server 80 may be omitted. In this case, the trajectory generation system 100 is implemented by the mobile manipulator 1 alone.

Figure 2:
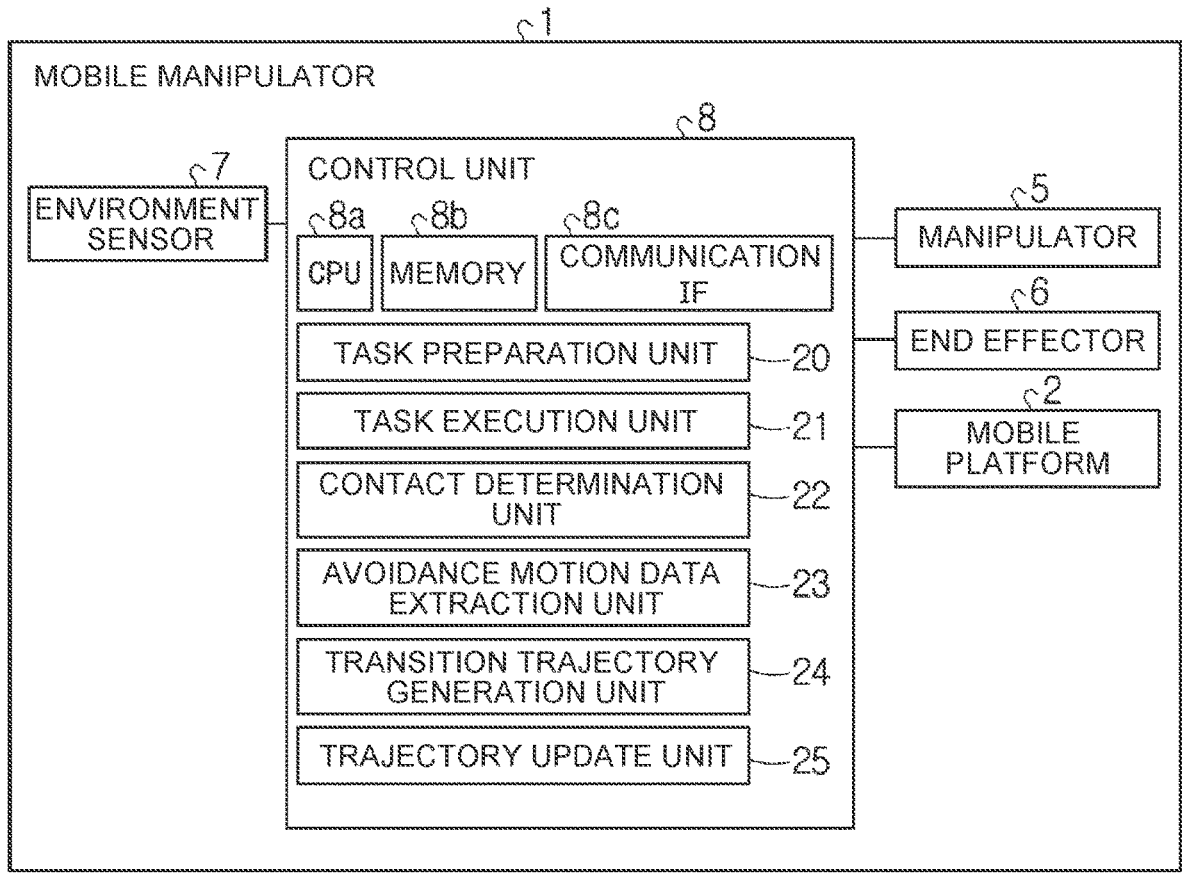
FIG. 2 is a functional block diagram of the mobile manipulator.

FIG. 2 is a functional block diagram of the mobile manipulator 1. As shown in FIG. 2, the control unit 8 includes a central processing unit (CPU) 8a, a memory 8b including a random access memory (RAM), a read-only memory (ROM), and a solid state drive (SSD), and a communication interface 8c. By the CPU 8a reading and executing a control program stored in the memory 8b, the control program causes hardware such as the CPU 8a to function as a task preparation unit 20, a task execution unit 21, a contact determination unit 22, and an avoidance motion data extraction unit 23, a transition trajectory generation unit 24, and a trajectory update unit 25.

Figures 3, 4:
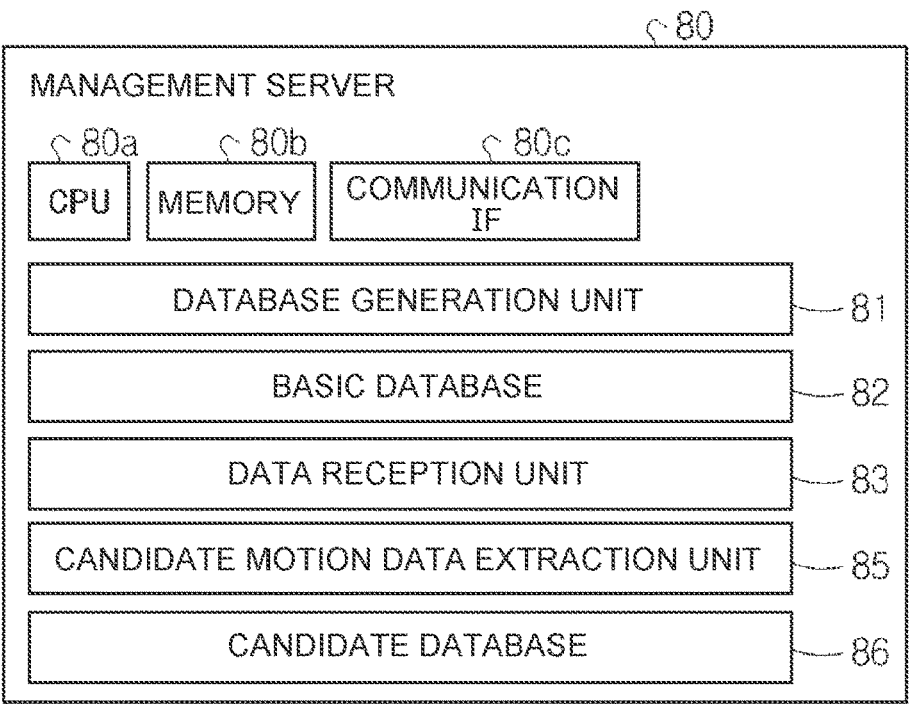
FIG. 3 is a functional block diagram of a management server.
FIG. 4 is a data structure diagram of a basic database.

FIG. 3 is a functional block diagram of the management server 80. As shown in FIG. 3, the management server 80 includes a central processing unit (CPU) 80a, a memory 80b including a random access memory (RAM), a read-only memory (ROM), and a solid state drive (SSD), and a communication interface 80c. By the CPU 80a reading and executing a control program stored in the memory 80b, the control program causes hardware such as the CPU 80a to function as a database generation unit 81, a basic database

82, a data reception unit 83, a candidate motion data extraction unit 85, and a candidate database 86.

The control unit 8 of the mobile manipulator 1 shown in FIG. 2 is configured to bidirectionally communicate with the management server 80 via the communication interface 8c. The management server 80 shown in FIG. 3 is configured to bidirectionally communicate with the mobile manipulator 1 via the communication interface 80c.

The database generation unit 81 shown in FIG. 3 generates the basic database 82. The database generation unit 81 generates the basic database 82 in the preparation stage for starting the operation of the mobile manipulator 1. That is, it is herein assumed that the basic database 82 has already been generated at the time the mobile manipulator 1 starts a task. The basic database 82 is a specific example of the "storage unit."

FIG. 4 shows a data structure of the basic database 82. As shown in FIG. 4, the basic database 82 is a database storing a plurality of pieces of motion data each including a target end-effector position and attitude y, a trajectory Q of the mobile manipulator 1 for moving an end-effector position and attitude of the mobile manipulator 1 to the target end-effector position and attitude y, and a swept volume (hereinafter simply referred to as "SV") that is the volume occupied by the mobile manipulator 1 as the mobile manipulator 1 moves along the trajectory Q. In the present embodiment, the basic database 82 stores N pieces of motion data.

The end-effector position and attitude refer to the position and attitude of the end effector 6 in a service coordinate system fixed to the service environment.

The trajectory Q is composed of a plurality of trajectory points q. The trajectory points q are obtained by discretizing the motion of the mobile manipulator 1 at predetermined time steps. Each trajectory point q is defined as given by the following expression. In the following expression, θ is a variable representing the joint angles of a plurality of joints of the manipulator 5 of the mobile manipulator 1 and the position and orientation of the mobile platform 2 of the mobile manipulator 1 in the service coordinate system. Therefore, each trajectory point q uniquely expresses the state of the mobile manipulator 1 in the service environment. In the following expression, N is the sum of the degrees of freedom of the mobile manipulator 1 and the degrees of freedom of the mobile platform 2.

$$q_i = \begin{bmatrix} \theta_{i1} \\ \theta_{i2} \\ \vdots \\ \theta_{iN} \end{bmatrix}$$

The swept volume (SV) is a three-dimensional shape defined by the mobile manipulator 1 as the mobile manipulator 1 moves along the trajectory Q. In other words, the SV is the volume occupied by the mobile manipulator 1 as the mobile manipulator 1 moves along the trajectory Q. In the present embodiment, the SV is expressed using the voxel method. The voxel method is a method in which the shape of a volume or object is expressed using a combination of identical small cubes.

The database generation unit 81 typically generates the basic database 82 by the following procedure. First, the database generation unit 81 constructs a service environment using, for example, a simulator such as a Gazebo simulator. At this time, the database generation unit 81 randomly arranges obstacles such as desks, shelves, and articles in the service environment. Next, the database generation unit 81 randomly sets a target end-effector position and attitude y, and generates a trajectory Q to the target end-effector position and attitude y. The database generation unit 81 may set the target end-effector position and attitude y based on a predetermined rule. For example, the database generation unit 81 may randomly set the target end-effector position and attitude y within an area ahead of the mobile manipulator 1. The database generation unit 81 may set the target end-effector position and attitude y based on user input. The database generation unit 81 typically generates the trajectory Q based on the Constrained Bi-directional Rapidly-Exploring Random Tree (CBiRRT). Specifically, the database generation unit 81 sets the trajectory Q so as to avoid three-dimensional point cloud data output from the environment sensor 7 of the mobile manipulator 1 on the simulator. The database generation unit 81 generates motion data in which the target end-effector position and attitude y, the trajectory Q, and the SV are associated with each other, and stores the generated motion data in the basic database 82. As an example, the database generation unit 81 generates several tens of thousands of pieces of motion data and stores them in the basic database 82.

Referring back to FIG. 2, when task data is acquired from user equipment, it triggers the task preparation unit 20 of the mobile manipulator 1 to control the environment sensor 7 and acquire from the environment sensor 7 three-dimensional point cloud data of the service environment at the time the mobile manipulator 1 starts a task. The task preparation unit 20 then sends the received three-dimensional point cloud data to the management server 80, and also sends a target end-effector position and attitude corresponding to the task to the management server 80 as target data.

The data reception unit 83 of the management server 80 shown in FIG. 3 receives the three-dimensional point cloud data and the target data from the mobile manipulator 1.

The candidate motion data extraction unit 85 is a specific example of the "first motion data extraction unit." The candidate motion data extraction unit 85 extracts from the basic database 82 motion data including a target end-effector position and attitude corresponding to the target end-effector position and attitude indicated by the target data. Since there are a wide variety of target end-effector positions and attitudes for each task, there is in reality no motion data including a target end-effector position and attitude that completely matches the target end-effector position and attitude indicated by the target data. Therefore, when extracting from the basic database 82 motion data including a target end-effector position and attitude corresponding to the target end-effector position and attitude indicated by the target data, the candidate motion data extraction unit 85 extracts from the basic database 82 motion data including a target end-effector position and attitude close to the target end-effector position and attitude indicated by the target data. Specifically, when the difference between the target end-effector position and attitude indicated by the target data and the target end-effector position and attitude of motion data is less than a predetermined amount, the candidate motion data extraction unit 85 extracts this motion data from the basic database 82. The predetermined amount is typically 30 cm for the target end-effector position and 90 degrees for the target end-effector attitude. The candidate motion data extraction unit 85 may be constructed by a trained neural network trained to extract from the basic database 82 motion data including a target end-effector position and attitude corresponding to the target end-effector position and attitude indicated by the target data when the target end-effector position and attitude indicated by the target data are input.

The candidate motion data extraction unit 85 narrows down a plurality of pieces of motion data extracted from the basic database 82. Specifically, the candidate motion data extraction unit 85 extracts a plurality of pieces of motion data including an SV that does not contact the service environment at the start of the task from the pieces of motion data extracted from the basic database 82. Prior to this extraction, the candidate motion data extraction unit 85 converts the three-dimensional point cloud data indicating the service environment at the start of the task to voxel data. This allows the candidate motion data extraction unit 85 to very quickly determine any physical interference between the voxel data indicating the service environment and the voxel data of the SV of each piece of motion data. The candidate motion data extraction unit 85 stores the pieces of motion data thus extracted in the candidate database 86 as candidate motion data. FIG. 5 shows an example of the data structure of the candidate database 86. As shown in FIG. 5, as an example, the candidate motion data extraction unit 85 extracts several dozen pieces of candidate motion data from the basic database 82 and stores them in the candidate database 86. Accordingly, no matter which piece of candidate motion data is used among the pieces of candidate motion data stored in the candidate database 86, the mobile manipulator 1 can complete the task without coming into contact with the service environment at the start of the task.

However, the extraction by the candidate motion data extraction unit 85 is based solely on the three-dimensional point cloud data of the service environment acquired at the time the mobile manipulator 1 starts the task. This three-dimensional point cloud data merely represents part of the service environment that can be observed from the mobile manipulator 1 at the time the mobile manipulator 1 starts the task. Therefore, there is a risk that the mobile manipulator 1 may come into contact with the service environment while the mobile manipulator 1 is moving after it started the task. In the present embodiment, as will be described later, when there is a risk that the mobile manipulator 1 may come into contact with the service environment while the mobile manipulator 1 is moving after it started the task, the mobile manipulator 1 refers to the candidate database 86 again to correct the trajectory of the mobile manipulator 1.

The time the mobile manipulator 1 starts the task is a specific example of the "first timing." Instead of being the time the mobile manipulator 1 starts the task, the first timing may be slightly before the time the mobile manipulator 1 starts the task, or slightly after the time the mobile manipulator 1 starts the task.

The candidate motion data extraction unit 85 acquires from the environment sensor 7 the three-dimensional point cloud data generated by the environment sensor 7 by measuring the service environment. Therefore, the candidate motion data extraction unit 85 should not be interpreted as including the environment sensor 7.

Referring back to FIG. 2, the task execution unit 21 is a specific example of the "task initiation unit." The task execution unit 21 starts the task based on initial motion data that is one of the pieces of candidate motion data extracted by the candidate motion data extraction unit 85 of the management server 80. Specifically, the task execution unit 21 refers to the candidate database 86 of the management server 80 and selects one piece of candidate motion data as the initial motion data from the pieces of candidate motion data stored in the candidate database 86. At this time, the task execution unit 21 typically selects from the pieces of candidate motion data the candidate motion data including a target end-effector position and attitude closest to the target end-effector position and attitude corresponding to the task. The task execution unit 21 controls the mobile platform 2 of the mobile manipulator 1, the manipulator 5, and the end effector 6 according to the trajectory Q of the initial motion data. The initial operation data is a specific example of the "first motion data."

As described above, the target end-effector position and attitude of the initial motion data and the target end-effector position and attitude corresponding to the task do not completely match. Therefore, when starting the task, the task execution unit 21 may generate a differential complementary trajectory that complements the difference between the target end-effector position and attitude of the initial motion data and the target end-effector position and attitude corresponding to the task.

The contact determination unit 22 then acquires three-dimensional point cloud data of the service environment in real time while the mobile manipulator 1 is moving after the mobile manipulator 1 started the task. The contact determination unit 22 thus determines whether the mobile manipulator 1 comes into contact with the service environment based on the three-dimensional point cloud data acquired in real time before the mobile manipulator 1 completes the task. In other words, the contact determination unit 22 acquires three-dimensional point cloud data of the service environment in real time while the mobile manipulator 1 is moving after the mobile manipulator 1 started the task, and thus determines whether the mobile manipulator 1 comes into contact with the service environment based on the "most recent" three-dimensional point cloud data before the mobile manipulator 1 completes the task. For example, it is herein assumed that there is an article in an area that is a blind spot from the environment sensor 7 of the mobile manipulator 1 at the time the mobile manipulator 1 starts the task, and that the article is on the trajectory Q of the initial motion data. In this case, as long as the mobile manipulator 1 moves along the trajectory Q of the initial motion data, the mobile manipulator 1 will eventually come into contact with the article.

Acquiring three-dimensional point cloud data of the service environment in real time while the mobile manipulator 1 is moving after the mobile manipulator 1 started the task is a specific example of acquiring three-dimensional data of the service environment in real time after the time the mobile manipulator 1 started the task. That is, the contact determination unit 22 may acquire three-dimensional point cloud data of the service environment in real time while the movement of the mobile manipulator 1 is stopped after the mobile manipulator 1 started the task.

Specifically, the contact determination unit 22 operates as follows. The contact determination unit 22 controls the environment sensor 7 to acquire three-dimensional point cloud data of the service environment at predetermined intervals while the mobile manipulator 1 is moving after the mobile manipulator 1 started the task. The contact determination unit 22 converts the acquired three-dimensional point cloud data to voxel data in order to make a quick determination. The contact determination unit 22 compares the converted voxel data with the voxel data of the SV of the initial motion data to determine whether the mobile manipulator 1 comes into contact with the service environment based on the three-dimensional point cloud data acquired in real time before the mobile manipulator 1 completes the task.

The contact determination unit 22 acquires from the environment sensor 7 the three-dimensional point cloud data generated by the environment sensor 7 by measuring the service environment. Therefore, the contact determination unit 22 should not be interpreted as including the environment sensor 7.

When the contact determination unit 22 determines that the mobile manipulator 1 comes into contact with the service environment based on the three-dimensional point cloud data acquired in real time before the mobile manipulator 1 completes the task, the avoidance motion data extraction unit 23 refers to the candidate database 86 of the management server 80 and extracts, as avoidance motion data, candidate motion data including an SV that does not contact the service environment based on the three-dimensional point cloud data acquired in real time from the pieces of candidate motion data stored in the candidate database 86. In other words, the avoidance motion data extraction unit 23 refers to the candidate database 86 of the management server 80 and extracts, as avoidance motion data, candidate motion data including an SV that does not contact the service environment based on the "most recent" three-dimensional point cloud data from the pieces of candidate motion data stored in the candidate database 86. The avoidance motion data extraction unit 23 is a specific example of the "second motion data extraction unit." Specifically, the avoidance motion data extraction unit 23 operates as follows.

The avoidance motion data extraction unit 23 compares the most recent voxel data generated by the contact determination unit 22 with the voxel data of the SV of each piece of candidate motion data to select, from the pieces of candidate motion data, candidate motion data including an SV that does not contact the service environment based on the three-dimensional point cloud data acquired in real time, and extract the selected candidate motion data as avoidance motion data. When there are two or more pieces of candidate motion data including an SV that does not contact the service environment based on the three-dimensional point cloud data acquired in real time, the avoidance motion data extraction unit 23 extracts one of the pieces of candidate motion data according to some rule. For example, the avoidance motion data extraction unit 23 may select candidate motion data including an SV closest to the SV of the initial motion data. The avoidance motion data extraction unit 23 may be constructed by a trained neural network trained to extract, as avoidance motion data, candidate motion data having an SV that does not contact the service environment based on the three-dimensional point cloud data acquired in real time, when the most recent three-dimensional point cloud data acquired in real time is input.

Figure 6:
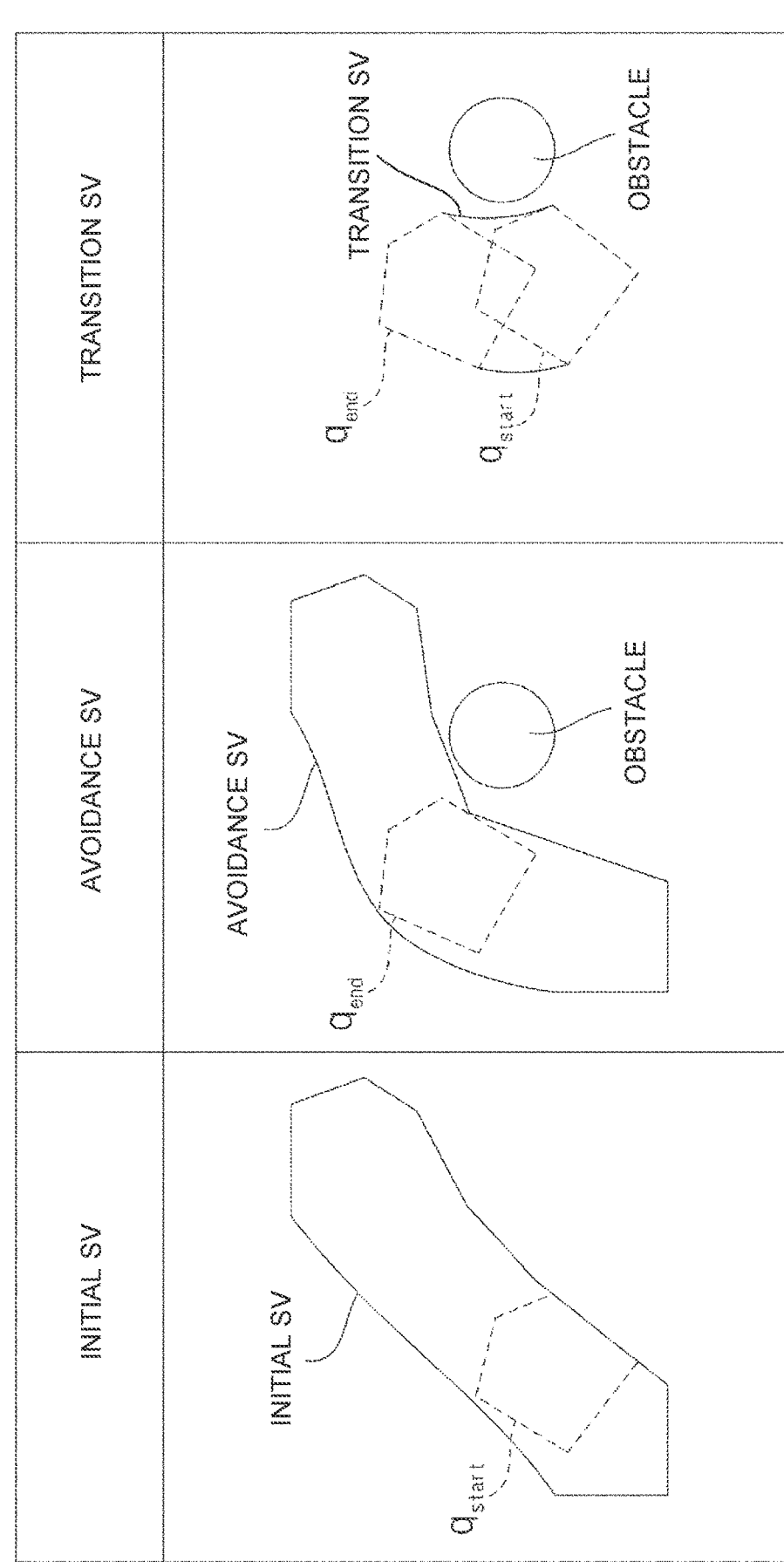
FIG. 6 shows comparison among an initial swept volume (SV), an avoidance SV, and a transition SV.

The transition trajectory generation unit 24 generates a transition trajectory for transitioning from the trajectory Q of the initial motion data to the trajectory Q of the avoidance motion data by using quadratic programming. The trajectory starting point of the transition trajectory is one of a plurality of trajectory points contained in the trajectory Q of the initial motion data. The trajectory end point of the transition trajectory is one of a plurality of trajectory points contained in the trajectory Q of the avoidance motion data. In FIG. 6, the SV of the trajectory Q of the initial motion data is shown as initial SV, the SV of the trajectory Q of the avoidance motion data is shown as avoidance SV, and the SV of the transition trajectory is shown as transition SV. FIG. 6 also shows the trajectory starting point $q_{start}$ and trajectory end point $q_{end}$ of the transition trajectory. FIG. 6 further shows an obstacle that does not exist in the service environment at the time the mobile manipulator 1 starts the task but appears in the service environment for the first time after the mobile manipulator 1 started the task. The calculation process for generating the transition trajectory by the transition trajectory generation unit 24 will be described in detail later.

The trajectory update unit 25 updates the trajectory from start to completion of the task by the mobile manipulator 1 based on the trajectory Q of the avoidance motion data and the transition trajectory. Specifically, the trajectory from start to completion of the task by the mobile manipulator 1 is the trajectory Q of the initial motion data before the update. The trajectory update unit 25 updates the trajectory from start to completion of the task by the mobile manipulator 1 with a trajectory obtained by connecting the trajectory Q of the initial motion data, the transition trajectory, and the trajectory Q of the avoidance motion data in this order. Specifically, the mobile manipulator 1 moves along the trajectory Q of the initial motion data until the mobile manipulator 1 reaches the trajectory starting point $q_{start}$ of the transition trajectory. When the mobile manipulator 1 reaches the trajectory starting point $q_{start}$ of the transition trajectory, the mobile manipulator 1 moves along the transition trajectory. When the mobile manipulator 1 reaches the trajectory end point $q_{end}$ of the transition trajectory, the mobile manipulator 1 moves along the trajectory Q of the avoidance motion data.

Next, the generation process for generating the transition trajectory by the transition trajectory generation unit 24 will be described in detail. The transition trajectory generation unit 24 first determines the trajectory starting point $q_{start}$ and trajectory end point $q_{end}$ of the transition trajectory, and then generates a transition trajectory connecting the trajectory starting point $q_{start}$ and trajectory end point $q_{end}$ of the transition trajectory.

Trajectory Starting Point $q_{start}$ of Transition Trajectory

The trajectory starting point $q_{start}$ of the transition trajectory is a trajectory point that simultaneously satisfies both (1) and (2) below.

(1) The trajectory starting point $q_{start}$ is a trajectory point of the trajectory Q of the initial motion data located downstream of the trajectory point reached by the mobile manipulator 1 moving along the trajectory Q of the initial motion data when a predetermined amount of time has elapsed since the contact determination unit 22 determined the mobile manipulator 1 comes into contact with the service environment based on the three-dimensional point cloud data acquired in real time before the mobile manipulator 1 completes the task.

(2) The trajectory starting point $q_{start}$ is a trajectory point of the trajectory Q of the initial motion data located upstream of the trajectory point at the time the mobile manipulator 1 moving along the trajectory Q of the initial motion data comes into contact with the service environment based on the three-dimensional point cloud data acquired in real time.

That is, setting the trajectory starting point $q_{start}$ of the transition trajectory near the obstacle allows time for the generation process for generating the transition trajectory, so that the mobile manipulator 1 can shift to the transition trajectory without stopping its movement. On the other hand, setting the trajectory starting point $q_{start}$ of the transition trajectory far from the obstacle allows to achieve a spatially smooth transition trajectory.

Trajectory End Point $q_{end}$ of Transition Trajectory

How the trajectory end point $q_{end}$ of the transition trajectory is determined is an important issue. That is, if the mobile manipulator 1 moves backward away from the target end-effector position and attitude when moving along the transition trajectory, the mobile manipulator 1 will not be able to complete the task in a short time. Therefore, the trajectory update unit 25 narrows down candidates for the trajectory end point $q_{end}$ from the trajectory points contained in the trajectory Q of the avoidance motion data based on the following expression.

$$\dot{Q} = \{q_i \in Q \mid \|q_i - q_{start}\| < d \wedge (q_i - q_{start}) \cdot (q_{i+1} - q_i) > 0\}$$

In the expression, Q' is a set of a plurality of trajectory points that can be candidates for the trajectory end point $q_{end}$. $q_i$ is the ith trajectory point of the trajectory Q of the avoidance motion data. Q is the trajectory Q of the avoidance motion data. $q_{start}$ is the trajectory starting point $q_{start}$ of the transition trajectory.

A first condition for narrowing down the candidates for the trajectory end point $q_{end}$ is a limitation by distance. That is, when the difference between the trajectory starting point $q_{start}$ and the trajectory point $q_i$ is equal to or larger than a predetermined value d, the trajectory point $q_i$ is excluded from the candidates. In short, when the position of the mobile manipulator 1 at the trajectory starting point $q_{start}$ and the position of the mobile manipulator 1 at the trajectory end point $q_{end}$ are too far apart, it will be difficult to generate a stable transition trajectory by quadratic programming. In other words, narrowing down the candidates for the trajectory end point $q_{end}$ so as to satisfy the first condition implements generation of a stable transition trajectory by quadratic programming.

A second condition for narrowing down the candidates for the trajectory end point $q_{end}$ is a condition for implementing smooth movement of the mobile manipulator 1 when shifting from the transition trajectory to the trajectory Q of the avoidance motion data. That is, when the angle between the direction of trajectory point $q_i$ and the direction immediately after completion of transition to the trajectory Q of the avoidance motion data as seen from the trajectory starting point $q_{start}$ of the transition trajectory is completed is larger than 90 degrees, the trajectory point $q_i$ is excluded from the candidates.

The transition trajectory generation unit 24 determines the most downstream trajectory point $q_i$ in the narrowed down set Q' to be the trajectory end point $q_{end}$. The time required for the mobile manipulator 1 to perform the task can thus be reduced. If there is no trajectory point $q_i$ that satisfies the above expression, the transition trajectory generation unit 24 gradually increases the predetermined value d until the trajectory point $q_i$ that satisfies the above expression appears.

Generation of Transition Trajectory

The transition trajectory generation unit 24 then generates a transition trajectory between the trajectory starting point $q_{start}$ and trajectory end point $q_{end}$ of the transition trajectory by quadratic programming.

That is, the transition trajectory generation unit 24 generates a transition trajectory connecting the trajectory starting point $q_{start}$ and trajectory end point $q_{end}$ of the transition trajectory by minimizing an objective function given by the following expression (1).

$$\text{minimize } f(x) + \mu g(x) \tag{1}$$

In the expression (1), f(x) is a potential function for reducing the movement of the mobile manipulator 1. That is, this potential function is a potential function for reducing the difference between two consecutive trajectory points of the mobile manipulator 1. This potential function is a specific example of the "first cost function." g(x) is a penalty function for obstacle avoidance. That is, this penalty function is a penalty function for reducing the interference depth between the mobile manipulator 1 and the service environment based on the three-dimensional point cloud data acquired in real time. This penalty function is a specific example of the "second cost function." μ is any desired constant that adjusts the balance between the two objective functions.

The variable x in the expression (1) means a transition trajectory x. The transition trajectory x is a set of a plurality of trajectory points $q_i$ as given by the following expression (2).

$$x = \begin{bmatrix} q_1 \\ q_2 \\ \vdots \\ q_T \end{bmatrix} \quad (2)$$

In the expression (2), $q_i$ is the ith transition point in the transition trajectory x. T is the number of time steps of the transition trajectory x. The transition trajectory generation unit 24 generates the transition trajectory x by updating the transition trajectory x until the SV of the transition trajectory x no longer contacts the service environment based on the three-dimensional point cloud data acquired in real time.

Penalty Function

Figure 7:
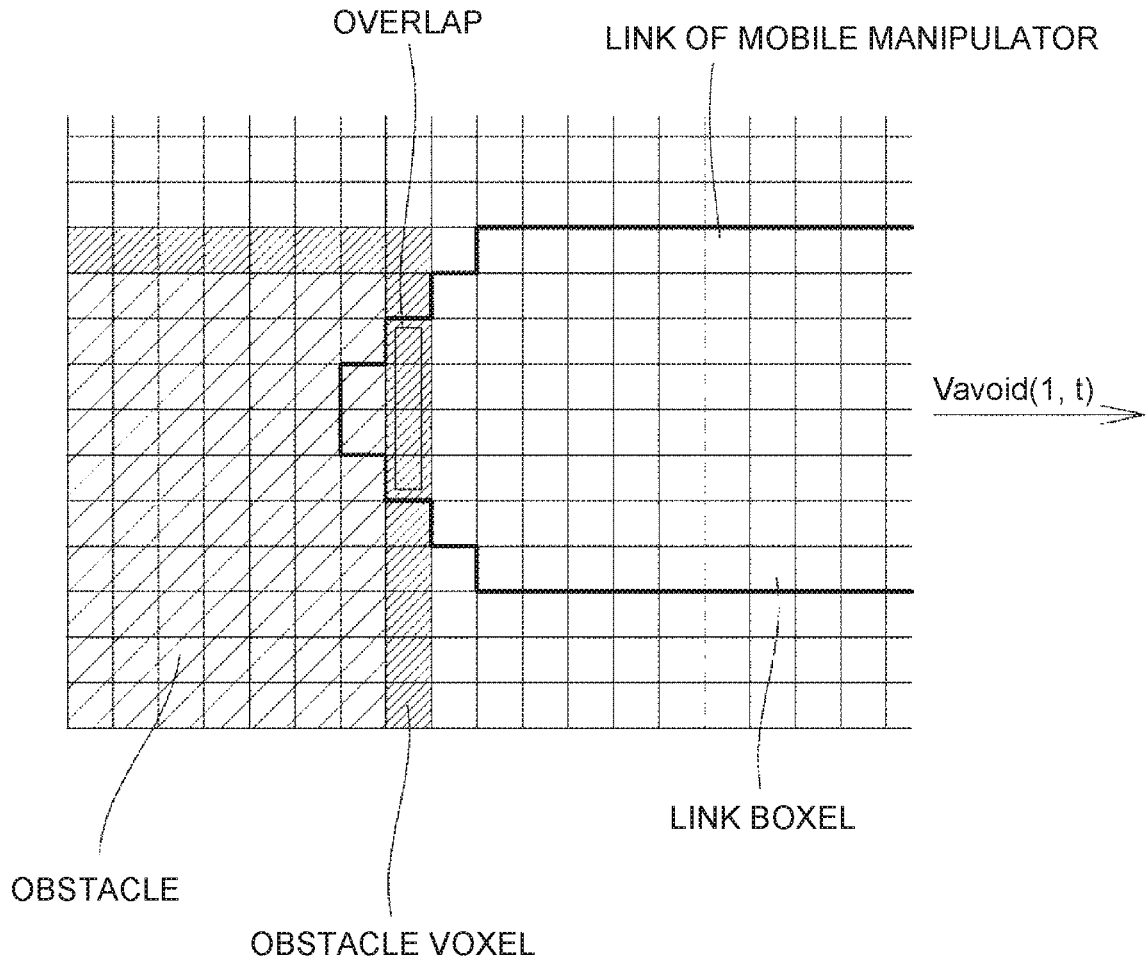
FIG. 7 illustrates an avoidance direction.

FIG. 7 shows the link of the mobile manipulator 1 interfering with an obstacle in a voxel space, and a desirable avoidance direction of the link of the mobile manipulator 1 at the time of this interference. It should be noted that the environment sensor 7 of the present embodiment detects only the surface of the obstacle and cannot detect the portion inside the surface of the obstacle. Hereinafter, the voxels where the surface of the obstacle is present are referred to as obstacle voxels, and the voxels where the link of the mobile manipulator 1 is present are referred to as link voxels. The overlapping portion between the obstacle voxels and the link voxels is as shown in FIG. 7.

The transition trajectory generation unit 24 obtains an avoidance direction $v_{avoid(l,t)}$ in FIG. 7 and an avoidance amount $sd_{lt}$ in the avoidance direction $v_{avoid(l,t)}$ in order to determine the penalty function for obstacle avoidance. The subscript lower case letter "l" is a link number, and the subscript lower case letter "t" is a time step number.

Figure 8:
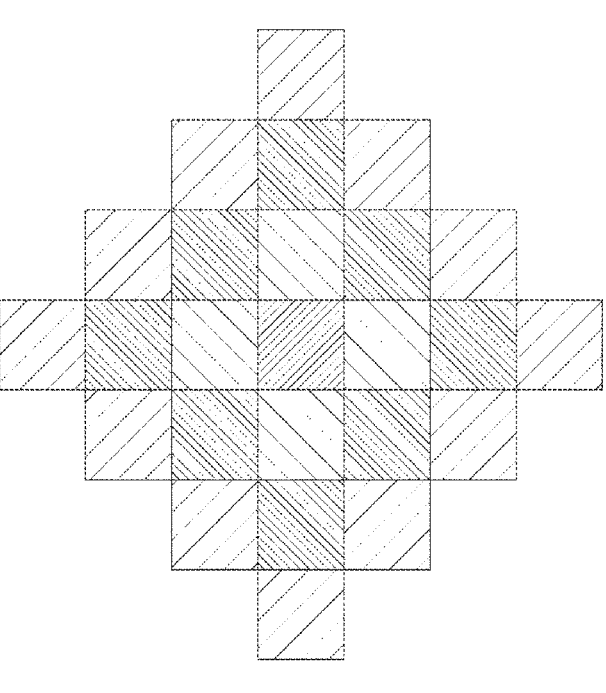
FIG. 8 illustrates a search range.
Figure 8:
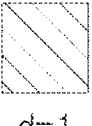
Figure 8:
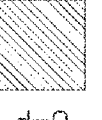
Figure 8:
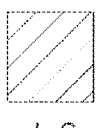

First, the transition trajectory generation unit 24 determines the avoidance direction $v_{avoid(l,t)}$ by the following procedure. The transition trajectory generation unit 24 determines the avoidance direction $v_{avoid(l,t)}$ by performing a voxel search. The voxel search is performed in a predetermined range about each link voxel. The search range is the range where L1 norm from the center voxel is equal to or less than d, where one side of the voxel is 1. d is any desired constant. FIG. 8 shows the search range on a two-dimensional plane. The transition trajectory generation unit 24 performs this search on all link voxels. The transition trajectory generation unit 24 determines the avoidance direction $v_{avoid(l,t)}$ by the following expression (3).

$$v_{avoid(l,t)} = -\frac{1}{\left\| \sum_{i=1}^{M_{lt}} v_i \right\|} \sum_{i=1}^{M_{lt}} v_i \quad (3)$$

In the expression (3), $M_{lt}$ is the number of obstacle voxels the searched voxel overlaps when the search is performed on the lth link at the tth step, and $v_i$ is the unit vector in the direction from the link voxel in the center of the search range to the obstacle voxel. In the expression (3), vectors in the opposite direction to $v_i$ are added, and the sum is divided by its norm to convert it to a unit vector. The avoidance direction $v_{avoid(l,t)}$ for moving away from the direction in which the obstacle is present is thus obtained.

Thereafter, the transition trajectory generation unit 24 obtains the avoidance amount $sd_{lt}$ in the avoidance direction $v_{avoid(l,t)}$ by the following procedure. A possible method to obtain the avoidance amount $sd_{lt}$ for avoiding the obstacle is to use the depth of interference (interference depth) between the obstacle and the link. In reality, however, only the surface of the obstacle can be voxelized. In this case, it is difficult to calculate the depth of interference by simple interference calculation. Therefore, the avoidance amount $sd_{lt}$ is determined using the number $C_{lt}$ of obstacle voxels overlapping the link voxels. In the example of FIG. 7, $C_{lt}$ is the total number of voxels shown by "overlap." The transition trajectory generation unit 24 determines the avoidance amount $sd_{lt}$ by the following expression (4).

$$sd_{lt} = a\log_{10}(bC_{lt} + 1) \quad (4)$$

In the expression (4), a and b are any desired constants. When the link of the mobile manipulator 1 significantly interferes with the obstacle, the value of $C_{lt}$ increases rapidly, so that the avoidance amount $sd_{lt}$ also becomes too large and minimization calculation (optimization calculation) becomes unstable. The logarithm is used on the right side of the expression (4) in order to prevent the minimization calculation (optimization calculation) from becoming unstable.

The penalty function g(x) is defined by the following expression (5) using the avoidance direction $v_{avoid(l,t)}$ and the avoidance amount $sd_{lt}$.

$$g(x) = \sum_{l=1}^{L} \sum_{t=1}^{T} \left| sd_{lt} - v_{avoid(l,t)}^T \Delta r_{lt} \right| \quad (5)$$

In the expression (5), $\Delta r_{lt}$ is the amount of change in position of the link after optimization, and is approximated by the following expression (6).

$$\Delta r_{lt} \approx J_{lt}(q_t')(q_t - q_t') \quad (6)$$

In the expression (6), $q_t'$ is the joint angle of the link before optimization, and $J_{lt}(q_t')$ is the Jacobian matrix for the position of the link. The above penalty function is the sum of the amounts by which the avoidance direction $v_{avoid(l,t)}$ component of the amount of change in position of the link due to optimization is less than the avoidance amount $sd_{lt}$. In other words, it can also be said that the penalty function is the amount by which the amount of change in position of the link violates the set avoidance amount $sd_{lt}$. By using this as a penalty function in the objective function in quadratic programming, it is possible to generate a transition trajectory that does not come into contact with the obstacle.

Potential Function

The potential function for movement has two roles. The first role is to minimize the movement of the mobile manipulator 1. The second role is to reduce spread between the trajectory points. This potential function is defined by the following expression (7) as a function of the potential stored in a spring when the trajectory points are connected by the spring whose equilibrium length is zero.

$$f(x) = \sum_{k=1}^{T-1} \|\omega_k(q_{k+1} - q_k)\|^2 \tag{7}$$

Figure 9:
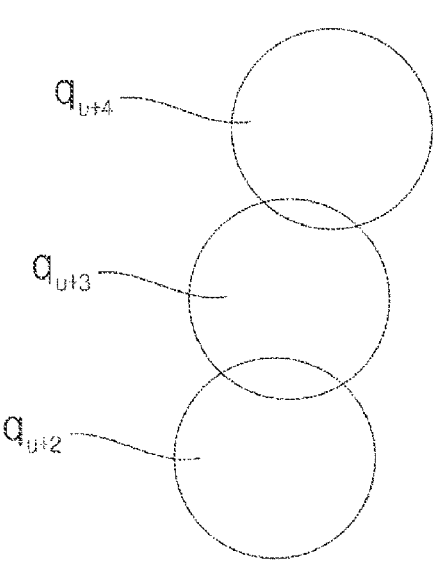
FIG. 9 shows the positional relationship between an obstacle and trajectory points.
Figure 9:
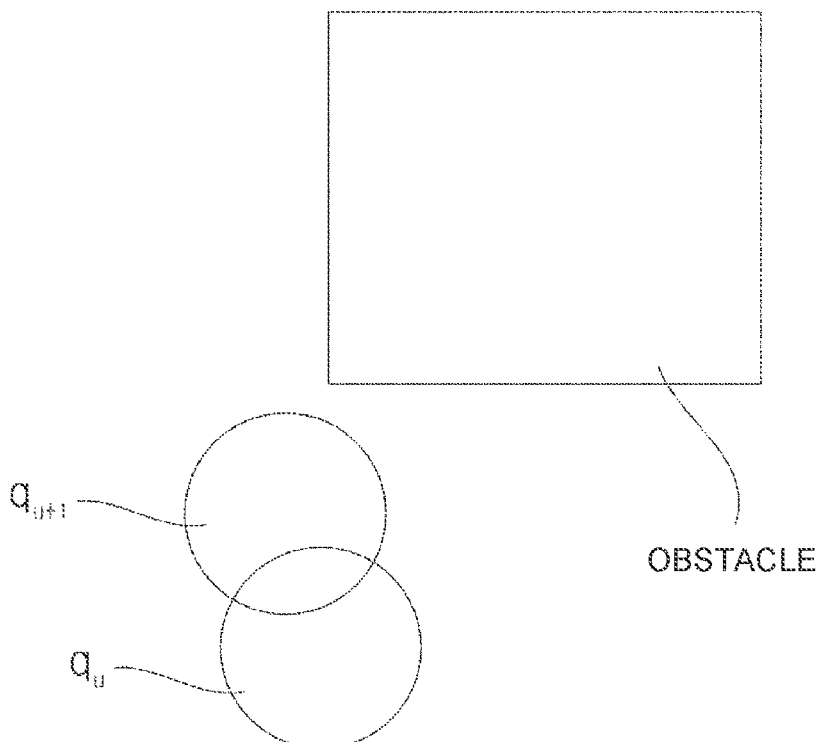

In the expression (7), $\omega_k$ is the spring constant of the spring connecting the trajectory point at the kth step and the trajectory point at the (k+1)th step. The reason for setting $\omega_k$ is to reduce the possibility of the trajectory points spreading apart near the obstacle as shown in FIG. 9 due to the penalty function g(x) for obstacle avoidance. In the penalty function for obstacle avoidance, each trajectory point is set so as not to contact the obstacle. Therefore, if the trajectory points spread apart, it may be difficult to generate the movement between the trajectory points so as not to come into contact with the obstacle. In the example of FIG. 9, the mobile manipulator 1 will come into contact with the obstacle when moving linearly from the trajectory point $q_{u+1}$ to the trajectory point $q_{u+2}$. Therefore, spread between the trajectory points near the obstacle is reduced by increasing the spring constant ok between those trajectory points that tend to spread apart. For two trajectory points that tend to separate away from each other, the set avoidance amount $sd_{lt}$ is necessarily large. Therefore, these two trajectory points are considered to be greatly affected by the penalty function for obstacle avoidance. For example, when the trajectory point at the kth step and the trajectory point at the (k+1)th step spread away, the values of the avoidance amounts $sd_{lk}$, $sd_{lk+1}$ are considered to be large. Therefore, $\omega_k$ is set based on the following expressions (8), (9).

$$\tilde{\omega}_k = \sum_{t=k}^{k+1} \sum_{l=1}^{L} sd_{lt} \tag{8}$$

$$\omega_k = c \frac{\tilde{\omega}_k - \min(\tilde{\omega})}{\sigma(\tilde{\omega})} + d \tag{9}$$

$$\tilde{\omega} = \{\tilde{\omega}_1, \ldots, \tilde{\omega}_{T\ldots1}\} \tag{10}$$

In the expression (9), c and d are any desired constants. The min function in the expression (9) extracts the smallest element in the set, and $\sigma$ is a standard deviation. $\omega_k$ tilde is the sum of the set avoidance amounts $sd_{lt}$ of the previous and subsequent steps. It is therefore possible to increase the spring constant $\omega_k$ between those trajectory points affected by the penalty function due to the obstacle. Since this spring constant $\omega_k$ need only be relatively large compared to other spring constants, the final spring constant $\omega_k$ can be a normalized value of $\omega_k$ tilde. By performing the normalization, the spring constant $\omega_k$ will not become too large. Since the expression (9) includes division by the standard deviation, the calculation is less likely to be affected by a change in magnitude of the overall avoidance amount $sd_{lt}$. Therefore, the influence of the constants a, b in the above expression (4) is reduced, facilitating adjustment of various parameters including the constants c, d.

Application to Quadratic Programming

Hereinafter, a method for adapting the penalty function for obstacle avoidance and the potential function for movement to quadratic programming will be described. The basic form of quadratic programming is as follows.

$$\text{minimize } f_o = \frac{1}{2} x^T A x + b^T x \tag{11}$$

$$\text{s.t. } f_c = Cx - d \le 0 \tag{12}$$

First, the penalty function g(x) for obstacle avoidance will be described. The penalty function g(x) is added to the objective function using a slack variable $s_{lt}$. At this time, the variable x for optimization is expanded as follows.

$$x' = \begin{bmatrix} x \\ s_{11} \\ \vdots \\ s_{LT} \end{bmatrix} \tag{13}$$

The following constraints are added to the inequality constraint in the above expression (12).

$$s_{lt} \ge 0 \tag{14}$$

$$v_{avoid(l,t)} J_{lt}(q'_t)(q_t - q'_t) + s_{lt} \ge sd_{lt} \tag{15}$$

Based on these two expressions, the minimum possible value of the slack variable $s_{lt}$ is as follows.

$$s_{lt} = \left| sd_{lt} - v_{avoid(l,t)} J_{lt}(q'_t)(q_t - q'_t) \right| \tag{16}$$

This is the same value as each term in the above expression (5). The cost function g(x') due to the obstacle can be transformed into a form that can be added to the objective function, as given by the following expression (17).

$$g(x') = \sum_{l=1}^{L} \sum_{t=1}^{T} s_{lt} = \begin{bmatrix} 0_{TN} \\ 1 \\ \vdots \\ 1 \end{bmatrix}^T x' \tag{17}$$

In the expression (17), $0_{TN}$ is a zero vector of a length T×N. The expression (17) can be added to the objective function by substituting the expression (17) for $b^T x$ in the above expression (11).

Next, the potential function f(x) for movement will be described. The potential function f(x) can be expressed as follows.

$$f(x) = x^T K^T K x \tag{18}$$

$$K = \begin{bmatrix} -\omega_1 & \omega_1 & 0 & 0 & & 0 & 0 \\ 0 & -\omega_2 & \omega_1 & 0 & \ldots & 0 & 0 \\ 0 & 0 & -\omega_3 & \omega_3 & & 0 & 0 \\ & \vdots & & \ddots & & & \vdots \\ 0 & 0 & 0 & \ldots & & -\omega_{T-1} & \omega_{T-1} \end{bmatrix} \otimes I_{N \times N} \tag{19}$$

In the expression (19), $I_{N \times N}$ is an N×N identity matrix. The above expression can be used as the objective function of quadratic programming by substituting $K^T K$ for A in the above expression (11). Expansion of the variable by the slack variable can be handled by adding 0 to the matrix K and expanding it so as to match the number of dimensions of the variable.

Lastly, the upper and lower limits of the joint angle of the manipulator 5 of the mobile manipulator 1 are set to the constraint of the above expression (12) to constrain the executable region to the movable range of the mobile manipulator 1.

Next, the operation flow of the trajectory generation system 100 will be described with reference to FIG. 10.

First, the database generation unit 81 of the management server 80 generates the basic database 82 (S100).

When a task is entered on the user equipment 90 (S110), the user equipment 90 sends task data to the mobile manipulator 1 (S120). When the task data is received from the user equipment 90, it triggers the task preparation unit 20 of the mobile manipulator 1 to acquire three-dimensional point cloud data of the service environment (S130) and send the three-dimensional point cloud data and target data indicating a target end-effector position and attitude corresponding to the task to the management server 80 (S140).

The candidate motion data extraction unit 85 of the management server 80 extracts candidate motion data from the basic database 82 (S150), and stores the extracted candidate motion data in the candidate database 86.

Thereafter, the task execution unit 21 of the mobile manipulator 1 refers to the candidate database 86 (S160) and starts the task based on initial motion data that is one of a plurality of pieces of candidate motion data (S170).

Subsequently, the contact determination unit 22 of the mobile manipulator 1 acquires three-dimensional point cloud data of the service environment while the mobile manipulator 1 is moving after the mobile manipulator 1 started the task (S180). The contact determination unit 22 then determines whether the mobile manipulator 1 comes into contact with the service environment before the mobile manipulator 1 completes the task (S190). When the contact determination unit 22 determines that the mobile manipulator 1 does not come into contact with the service environment until the mobile manipulator 1 completes the task, the process proceeds to S240. On the other hand, when the contact determination unit 22 determines that the mobile manipulator 1 comes into contact with the service environment before the mobile manipulator 1 completes the task, the process proceeds to S200.

In step S200, the avoidance motion data extraction unit 23 refers to the candidate database 86 of the management server 80 (S200), and extracts, as avoidance motion data, candidate motion data including an SV that does not contact the service environment from the pieces of candidate motion data stored in the candidate database 86 (S210).

The transition trajectory generation unit 24 then generates a transition trajectory for transitioning from the trajectory Q of the initial motion data to the trajectory Q of the avoidance motion data by using quadratic programming (S220).

Thereafter, the trajectory update unit 25 updates the trajectory to completion of the task by the mobile manipulator 1 based on the trajectory Q of the avoidance motion data and the transition trajectory (S230). When updating the trajectory to completion of the task by the mobile manipulator 1, the trajectory update unit 25 will generate the differential complementary trajectory again.

The control unit 8 then determines whether the mobile manipulator 1 has completed the task (S240). It should be noted that the task also includes the differential complementary trajectory described above. When the control unit 8 determines that the mobile manipulator 1 has completed the task, the process ends. On the other hand, when the control unit 8 determines that the mobile manipulator 1 has not completed the task, the process returns to S180. Subsequently, every time the contact determination unit 22 determines that the mobile manipulator 1 comes into contact with the service environment (S190), steps S200 to S240 are repeated.

The preferred embodiment of the present disclosure described above has the following features.

The trajectory generation system 100 includes the basic database 82 (database), the candidate motion data extraction unit 85 (first motion data extraction unit), the task execution unit 21 (task initiation unit), the contact determination unit 22, the avoidance motion data extraction unit 23 (second motion data extraction unit), and the transition trajectory generation unit 24.

The basic database 82 stores a plurality of pieces of motion data each including a target end-effector position and attitude, a trajectory Q of the mobile manipulator 1 for moving the end-effector position and attitude of the mobile manipulator 1 to the target end-effector position and attitude, and a swept volume (SV) that is the volume occupied by the mobile manipulator 1 as the mobile manipulator 1 moves along the trajectory Q. When the mobile manipulator 1 starts a task, the candidate motion data extraction unit 85 acquires three-dimensional point cloud data of a service environment, and extracts, as candidate motion data, a plurality of pieces of motion data including a target end-effector position and attitude close to the target end-effector position and attitude corresponding to the task and including an SV that does not contact the service environment based on the three-dimensional data acquired at the time the mobile manipulator 1 starts the task, from the basic database 82.

The task execution unit 21 starts the task based on initial motion data (first motion data) that is one of the pieces of candidate motion data.

The contact determination unit 22 acquires three-dimensional point cloud data of the service environment in real time while the mobile manipulator 1 is moving after the mobile manipulator 1 started the task. The contact determination unit 22 thus determines whether the mobile manipulator 1 comes into contact with the service environment based on the three-dimensional data acquired in real time before the mobile manipulator 1 completes the task. When the contact determination unit 22 determines that the mobile manipulator 1 comes into contact with the service environment based on the three-dimensional point cloud data acquired in real time before the mobile manipulator 1 completes the task, the avoidance motion data extraction unit 23 extracts, as avoidance motion data (second motion data), motion data having an SV that does not contact the service environment based on the three-dimensional point cloud data acquired in real time from the pieces of candidate motion data. The transition trajectory generation unit 24 generates a transition trajectory for transitioning from the trajectory Q of the initial motion data to the trajectory Q of the avoidance motion data.

According to the above configuration, when determination is made that the mobile manipulator 1 comes into contact with the service environment while the mobile manipulator 1 is moving after it started the task, the trajectory of the mobile manipulator 1 that allows the mobile manipulator 1 to complete the task while avoiding contact with the service environment can be generated in a short time. The trajectory of the mobile manipulator 1 can be generated in a short time because the avoidance motion data extraction unit 23 extracts the avoidance motion data from the plurality of pieces of candidate motion data extracted by the candidate motion data extraction unit 85, rather than extracting the avoidance motion data from the plurality of pieces of motion data stored in the basic database 82.

The difference between the trajectory starting point $q_{start}$ of the transition trajectory and the trajectory end point $q_{end}$ of the transition trajectory may be less than a predetermined value. According to the above configuration, the transition trajectory generation process is stabilized.

The angle between the direction of the trajectory end point $q_{end}$ of the transition trajectory and the direction immediately after completion of transition to the trajectory of the second motion data as seen from the trajectory starting point $q_{start}$ of the transition trajectory may be less than a predetermined value. According to the above configuration, smooth movement of the mobile manipulator 1 can be implemented when shifting from the transition trajectory to the trajectory of the avoidance motion data.

The trajectory end point $q_{end}$ of the transition trajectory may be the most downstream trajectory point $q_i$ among the plurality of trajectory points $q_i$ that simultaneously satisfies the following first and second conditions.

The first condition is a condition that the difference between the trajectory starting point $q_{start}$ of the transition trajectory and the trajectory end point $q_{end}$ of the transition trajectory is less than a predetermined value.

The second condition is a condition that the angle between the direction of the trajectory end point $q_{end}$ and the direction immediately after completion of transition to the trajectory Q of the avoidance motion data as seen from the trajectory starting point $q_{start}$ is less than a predetermined value.

According to the above configuration, the transition trajectory generation process is stabilized, smooth movement of the mobile manipulator 1 can be implemented when shifting from the transition trajectory to the trajectory of the avoidance motion data, and the time required for the mobile manipulator 1 to perform the task can be reduced.

As shown by the expression (1), the transition trajectory generation unit 24 generates the transition trajectory by quadratic programming based on the potential function (first cost function) for reducing the difference between two consecutive trajectory points of the mobile manipulator 1 and the penalty function (second cost function) for avoiding the service environment based on the three-dimensional data acquired in real time. According to the above configuration, the transition trajectory can be efficiently generated.

As shown by the expression (7), the transition trajectory generation unit 24 calculates the potential function by weighting the difference between two consecutive trajectory points of the mobile manipulator 1 based on the avoidance amount $sd_{it}$ and obtaining the sum of differences after the weighting, the avoidance amount being an amount for allowing the mobile manipulator 1 to avoid the service environment based on the three-dimensional data acquired in real time.

According to the above configuration, when generating the transition trajectory so as to avoid contact between the mobile manipulator 1 and the service environment based on the three-dimensional point cloud data acquired in real time, the two consecutive trajectory points are less likely to separate too far away from each other.

As shown by the expression (4), the transition trajectory generation unit 24 calculates the avoidance amount $sd_{it}$ based on the logarithm of the amount of overlap $C_{it}$ between the mobile manipulator 1 and the service environment based on the three-dimensional point cloud data acquired in real time, the avoidance amount $sd_{it}$ being an amount for allowing the mobile manipulator 1 to avoid the service environment based on the three-dimensional data acquired in real time.

According to the above configuration, the transition trajectory generation process using quadratic programming is stabilized.

The above embodiment can be modified as follows.

Figure 10:
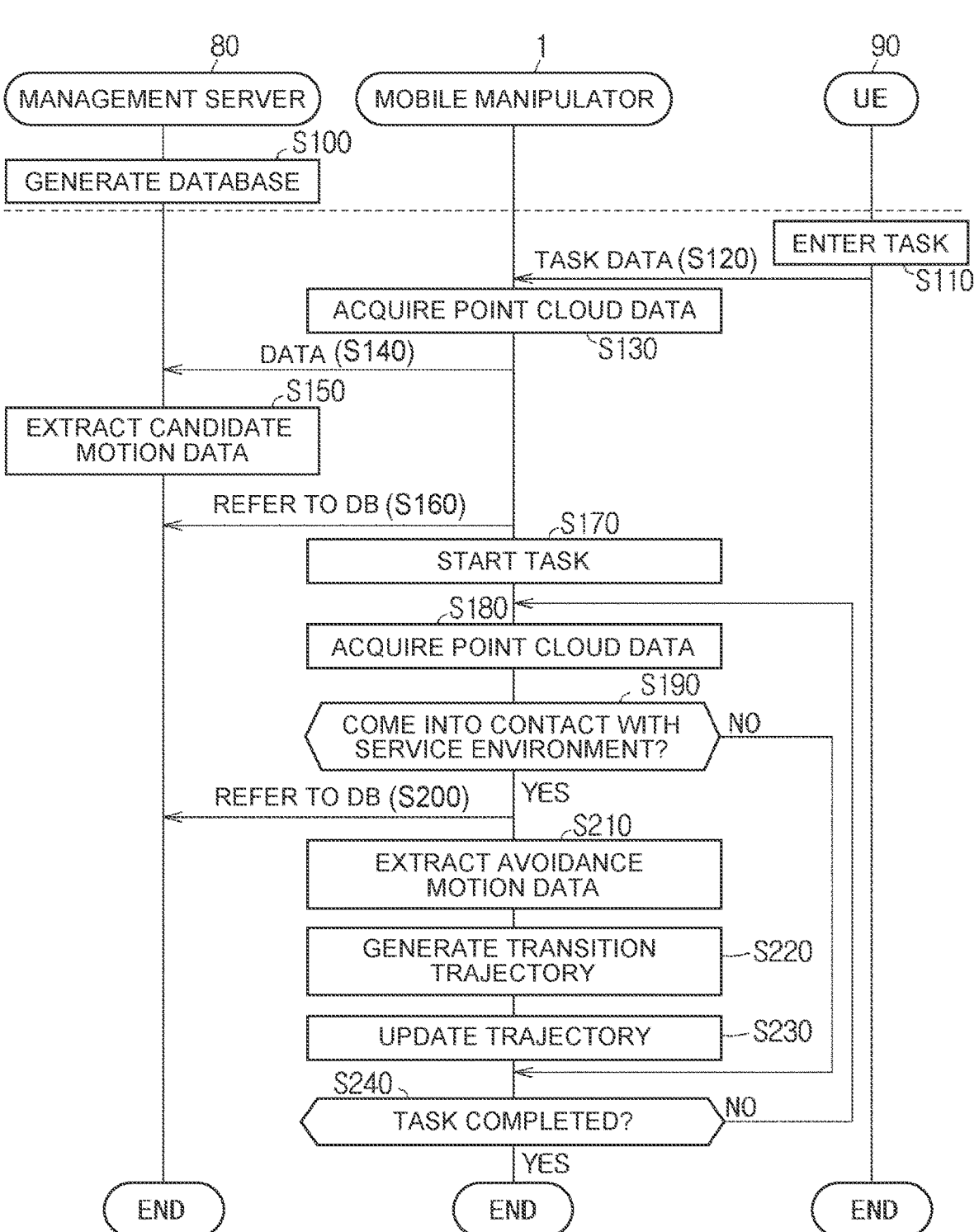
FIG. 10 shows a control flow of a trajectory generation system.

As shown in FIG. 10, the user equipment 90 is configured to send task data to the mobile manipulator 1 (S120). However, the user equipment 90 may alternatively be configured to send task data to the management server 80. In this case, the task data is transferred from the management server 80 to the mobile manipulator 1.

In the above example, the program can be stored and supplied to a computer by using various types of non-transitory computer-readable media. The non-transitory computer-readable media include various types of tangible recording media. Examples of the non-transitory computer-readable media include magnetic recording media (e.g., flexible disk, magnetic tape, and hard disk drive) and magneto-optical recording media (e.g., magneto-optical disk). Further examples of the non-transitory computer-readable media include a compact disc read-only memory (CD-ROM), a compact disc recordable (CD-R), a compact disc rewritable (CD-RW), and a semiconductor memory (e.g., a mask read-only memory (mask ROM)). Further examples of the non-transitory computer-readable media include a programmable read-only memory (PROM), an erasable programmable read-only memory (EPROM), a flash read-only memory (flash ROM), and a random access memory (RAM). The program may be supplied to the computer by various types of transitory computer-readable media. Examples of the transitory computer-readable media include electrical signals, optical signals, and electromagnetic waves. The transitory computer-readable medium can supply the program to the computer via a wired communication path such as electric wire and optical fiber, or a wireless communication path.

What is claimed is:

1. A trajectory generation system, comprising:

one or more memories, the one or more memories being configured to store a plurality of pieces of motion data, the motion data including a target end-effector position and attitude, a trajectory of a mobile manipulator for moving an end-effector position and attitude of the mobile manipulator to the target end-effector position and attitude, and a swept volume, the swept volume being a three-dimensional shape defined by the mobile manipulator as the mobile manipulator moves along the trajectory; and one or more processors, the one or more processors being configured to, acquire three-dimensional data of an environment at a first timing;

extract a plurality of pieces of motion data from the one or more memories, the motion data including the target end-effector position and attitude corresponding to a task, and including a swept volume that does not contact the environment based on the three-dimensional data acquired at the first timing;

start the task based on first motion data, the first motion data being one of the extracted pieces of motion data;

acquire the three-dimensional data of the environment in real time after the first timing;

determine whether the three-dimensional data of the environment in real time includes an article that is in an area in the environment that is a blind spot from an environment sensor of the mobile manipulator at the first timing and that is detected by the environment sensor in real time, determine whether the mobile manipulator comes into contact with the article based on the three-dimensional data acquired in real time before the mobile manipulator completes the task;

when determination is made that the mobile manipulator comes into contact with the article, extract, as second motion data, motion data including a swept volume that does not contact the article based on the three-dimensional data acquired in real time from the extracted pieces of motion data; and generate a transition trajectory for transitioning from a trajectory of the first motion data to a trajectory of the second motion data.

2. The trajectory generation system according to claim 1, wherein a difference between a trajectory starting point of the transition trajectory and a trajectory end point of the transition trajectory is less than a predetermined value.

3. The trajectory generation system according to claim 1, wherein an angle between a first direction and a second direction is less than a predetermined value, the first direction being a direction of a trajectory end point of the transition trajectory as seen from a trajectory starting point of the transition trajectory and the second being a direction immediately after completion of transition to the trajectory of the second motion data.

4. The trajectory generation system according to claim 1, wherein a trajectory end point of the transition trajectory is a most downstream trajectory point among a plurality of trajectory points that simultaneously satisfies a first condition that a difference between a trajectory starting point of the transition trajectory and the trajectory end point of the transition trajectory is less than a predetermined value, and a second condition that an angle between a first direction of the trajectory end point and a second direction immediately after completion of transition to the trajectory of the second motion data as seen from the trajectory starting point is less than a predetermined value, the first direction being a direction of the trajectory end point as seen from the trajectory starting point and the second being a direction immediately after completion of transition to the trajectory of the second motion data.

5. The trajectory generation system according to claim 1, wherein the one or more processors are configured to generate the transition trajectory by quadratic programming based on a first cost function for reducing a difference between two consecutive trajectory points of the mobile manipulator and a second cost function for avoiding the article based on the three-dimensional data acquired in real time.

6. The trajectory generation system according to claim 5, wherein the one or more processors is configured to calculate the first cost function by weighting the difference between the two consecutive trajectory points of the mobile manipulator based on an avoidance amount and obtaining a sum of differences after weighting, the avoidance amount being an amount for allowing the mobile manipulator to avoid the article based on the three-dimensional data acquired in real time.

7. The trajectory generation system according to claim 5, wherein the one or more processors are configured to calculate an avoidance amount based on a logarithm of an amount of overlap between the mobile manipulator and the article based on the three-dimensional data acquired in real time, the avoidance amount being an amount for allowing the mobile manipulator to avoid the article based on the three-dimensional data acquired in real time.

8. The trajectory generation system according to claim 1, wherein the one or more processors is further configured to:

generate a comparison between the three-dimensional data of the environment in real time and the three-dimensional data of the environment at the first timing; and determine, based on the comparison, whether the mobile manipulator comes into contact with the article based on the three-dimensional data acquired in real time before the mobile manipulator completes the task.

9. The trajectory generation system according to claim 1, wherein the one or more processors is further configured to:

control the environment sensor to acquire three-dimensional point cloud data of the environment at predetermined intervals while the mobile manipulator is moving after the mobile manipulator started the task;

convert the acquired three-dimensional point cloud data to voxel data; and compare the converted voxel data with voxel data of the swept volume of the first motion data to determine whether the mobile manipulator comes into contact with the article.

10. A trajectory generation method in which a computer generates a trajectory by referring to one or more memories configured to store a plurality of pieces of motion data, the motion data including a target end-effector position and attitude, a trajectory of a mobile manipulator for moving an end-effector position and attitude of the mobile manipulator to the target end-effector position and attitude, and a swept volume, the swept volume being a three-dimensional shape defined by the mobile manipulator as the mobile manipulator moves along the trajectory, the trajectory generation method comprising:

acquiring three-dimensional data of an environment at a first timing;

extracting a plurality of pieces of motion data from the one or more memories, the motion data including the target end-effector position and attitude corresponding to a task and including a swept volume that does not contact the environment based on the three-dimensional data acquired at the first timing;

starting the task based on first motion data, the first motion data being one of the extracted pieces of motion data;

acquiring the three-dimensional data of the environment in real time after the first timing;

determining whether the three-dimensional data of the environment in real time includes an article that is in an area in the environment that is a blind spot from an environment sensor of the mobile manipulator at the first timing and that is detected by the environment sensor in real time, determining whether the mobile manipulator comes into contact with the article based on the three-dimensional data acquired in real time before the mobile manipulator completes the task;

when determination is made that the mobile manipulator comes into contact with the article, extracting, as second motion data, motion data including a swept volume that does not contact the article based on the three-dimensional data acquired in real time from the extracted pieces of motion data; and generating a transition trajectory for transitioning from a trajectory of the first motion data to a trajectory of the second motion data.

11. A non-transitory storage medium storing instructions that are executable by one or more processors and that cause the one or more processors to perform the trajectory generation method according to claim 10.

12. The trajectory generation method according to claim 10, further comprising:

generating a comparison between the three-dimensional data of the environment in real time and the three-dimensional data of the environment at the first timing; and determining, based on the comparison, whether the mobile manipulator comes into contact with the article based on the three-dimensional data acquired in real time before the mobile manipulator completes the task.

13. The trajectory generation method according to claim 10, further comprising:

controlling the environment sensor to acquire three-dimensional point cloud data of the environment at predetermined intervals while the mobile manipulator is moving after the mobile manipulator started the task;

converting the acquired three-dimensional point cloud data to voxel data; and comparing the converted voxel data with voxel data of the swept volume of the first motion data to determine whether the mobile manipulator comes into contact with the article.

* * * * *